United States Patent [19]

Williams

[11] Patent Number: 4,622,135
[45] Date of Patent: Nov. 11, 1986

[54] GREASE FILTERING APPARATUS

[76] Inventor: Calvin Williams, 1156 W. 65th St., Inglewood, Calif. 90302

[21] Appl. No.: 665,556

[22] Filed: Oct. 29, 1984

[51] Int. Cl.⁴ .............................................. B01D 29/04
[52] U.S. Cl. .................................. 210/167; 137/335; 137/341; 137/563; 137/862; 210/101; 210/416.5
[58] Field of Search .................. 210/167, 416.5, 433.1, 210/101, 130, 416.1; 99/403, 408; 137/563, 565, 862, 887, 335, 341

[56] References Cited

U.S. PATENT DOCUMENTS

| | | | |
|---|---|---|---|
| 1,194,676 | 8/1916 | Slaw | 137/862 X |
| 1,713,657 | 5/1929 | Hogan | 137/563 X |
| 2,286,432 | 6/1942 | Monsarrat | 137/563 X |
| 2,578,129 | 12/1951 | Daugherty | 210/167 X |
| 2,685,276 | 8/1954 | Dyken | 137/887 X |
| 2,902,161 | 9/1959 | Humbert, Jr. et al. | 210/416.5 |
| 3,263,818 | 8/1966 | Gedrich | 210/167 X |
| 3,279,605 | 10/1966 | Shepherd | 210/416.5 X |
| 3,355,026 | 11/1967 | Schut | 210/416.5 |
| 3,970,558 | 7/1976 | Lee | 210/167 X |
| 4,113,623 | 9/1978 | Koether et al. | 210/167 |
| 4,210,123 | 7/1980 | Moore et al. | 137/563 X |
| 4,282,094 | 8/1981 | Mitchell | 210/167 |
| 4,396,505 | 8/1983 | Willson et al. | 210/167 X |

Primary Examiner—Richard L. Chiesa

[57] ABSTRACT

An oil filtering machine for filtering the hot cooking oil in the cooking vessel of a deep fryer unit when the deep fryer unit is in normal use. The machine includes an oil filtering unit, a motor driven pump and a liquid circulating system in which the pump is connected and which is connected with the deep fryer unit and the oil filter unit. The liquid circulating system includes a pair of suction lines extending from the pump to the deep fryer and oil filtering units and a pair of liquid return lines extending from the pump to the deep fryer and oil filtering units and valve means controlling the flow of oil through the suction lines to the pump and from the pump through the return lines.

10 Claims, 9 Drawing Figures

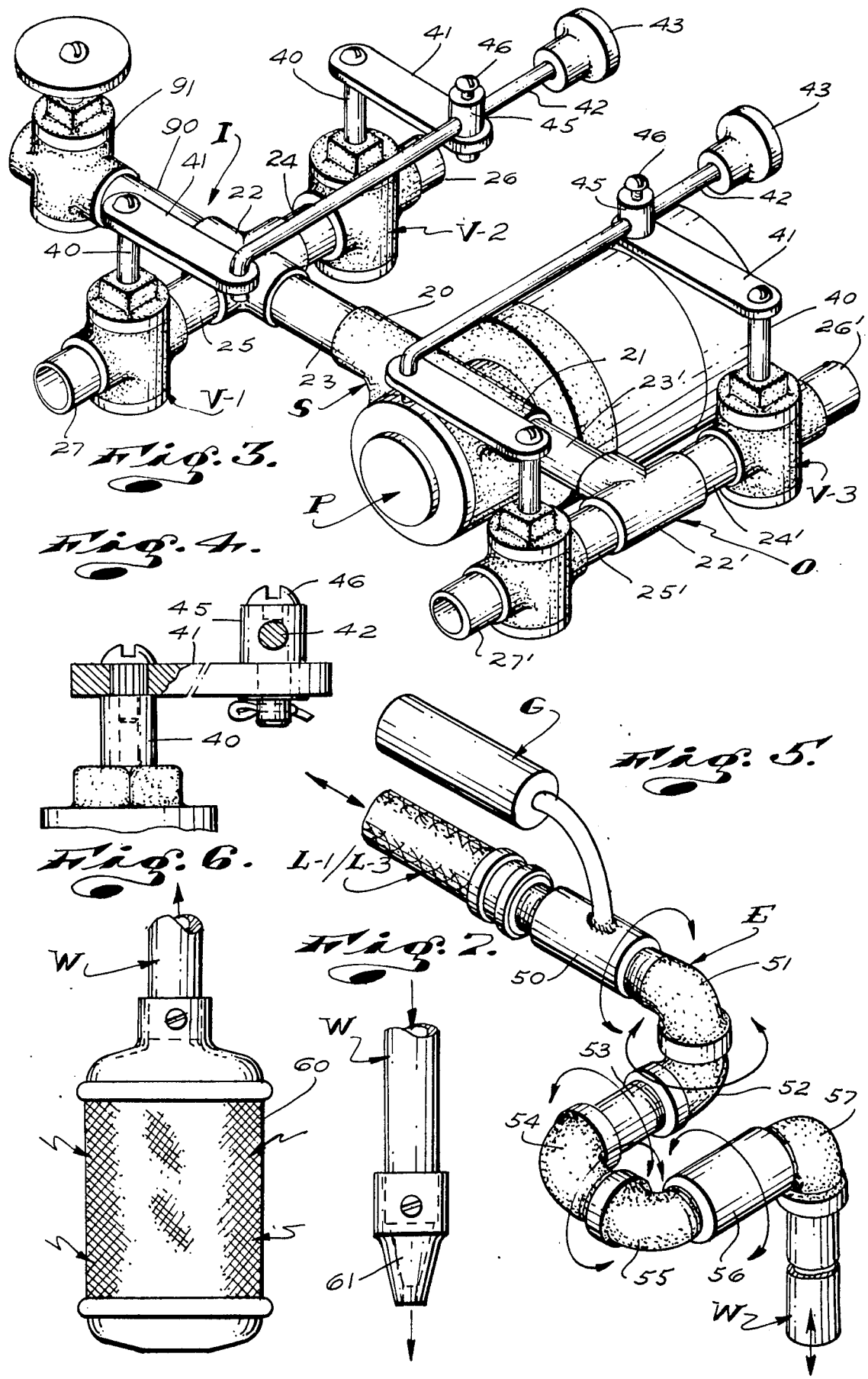

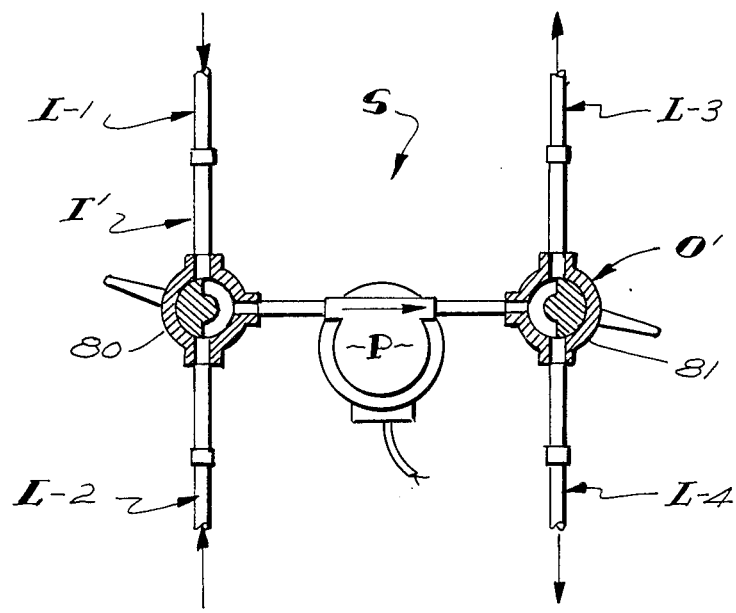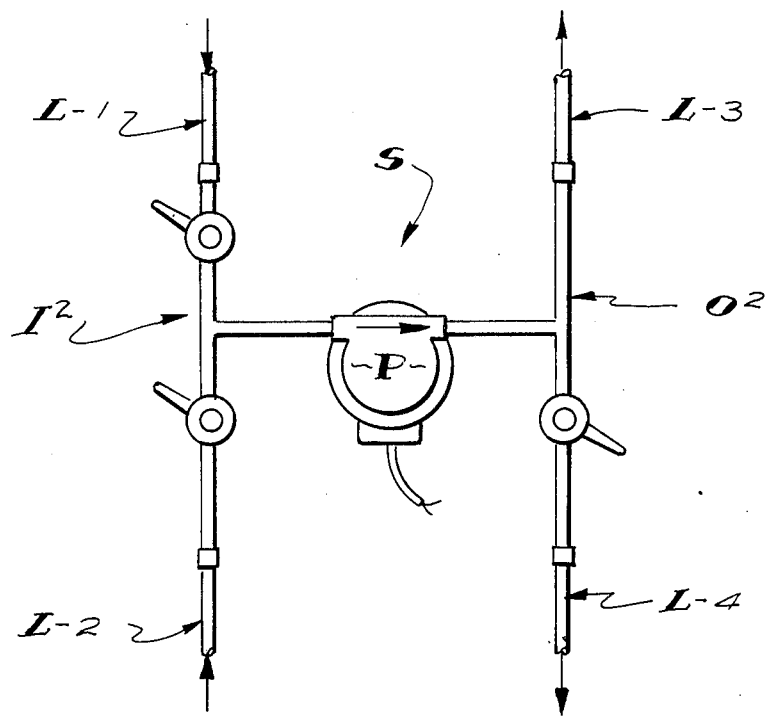

GREASE FILTERING APPARATUS

This invention has to do with an oil filtering machine and is particularly concerned with a machine for filtering the hot cooking oils in commercial deep fryers.

BACKGROUND OF THE INVENTION

In the art of cooking foods, it is common practice to "deep fry" certain foods by immersing those foods in large volumes of heated fats or oils. Further, in many instances, foods that are deep fried are first dipped in a suitable flour base batter which browns and establishes an attractive and tasty crust on and about the foods during deep frying of the foods.

In the commercial food industry, deep frying of foods is carried out in deep fryers which consist of large upwardly opening vessels in which large volumes of cooking oil are deposited and which include thermostatically controlled gas or electric heating elements to heat and maintain the oils in the vessels at desired cooking temperatures. Generally, the cooking temperatures in deep fryers range from 325° F. to 400° F.

The oil used in deep fryers is costly and is subject to being rapidly degraded and rendered unsuitable for use by the burning and heat reduction of the food stuff cooked therein. While certain fatty acids leeched and/or rendered from foods during deep frying adversely react with and degrade cooking oils, the most common and notable adverse effects and degrading of such oils is caused by bits and pieces of food which separate from the food being cooked and which remain suspended in the cooking oil to eventually burn or become reduced to varnish like sludge. The burned food stuff and/or residue in cooking oils in deep fryers discolors the oils and the foods cooked therein; impart a burned or otherwise unpleasant taste and odor to the foods cooked therein and oftentimes clings to and contaminates the foods cooked therein, rendering them unattractive and unsuitable to be served and eaten.

As a result of the above, to extend the useful life of cooking oils in deep fryers, the prior art has provided numerous different forms of oil filtering machines expressly made to remove those materials and/or impurities which, if left in the oils, will result in the rapid and premature degradation thereof.

The majority of the prior art filtering machines for the purpose set forth above, of which I am familiar, are rather simple in form and are generally characterized by large holding tanks, which tanks are sufficiently large to receive and hold the full supplies of oil in the cooking vessels of the deep fryers that the machines are intended to service. Such machines are further characterized by liquid handling systems including motor driven pumps and valves which operate to draw oil from deep fryers and deliver it into the holding tanks of the machines and to thereafter move the oil from the holding tanks back into the deep fryers. Finally, such machines are characterized by special and unique filtering devices to filter the oils handled thereby, as the oils are moved from the deep fryers into the holding tanks of the machines.

One major shortcoming common in most prior art oil filtering machines of the character here concerned is that their holding tanks are necessarily quite large and the resulting machines are so large and space-consuming that they are difficult and troublesome to use in those confined quarters or areas in which deep fryers are commonly used.

Another major shortcoming in most prior art oil filtering machines resides in the fact that they operate to receive the full supplies of oil in the deep fryers which they service and require that the deep fryers be put out of service when their supplies of oil are being filtered. Thus, filtering of the oil in deep fryers by those machines provided by the prior art must, as a general rule, be put off or postponed to those periods of time when the deep fryers are not otherwise in use.

Another major shortcoming in most prior art oil filter machines resides in the fact that the hot oils drawn from the deep fryers being serviced are let to cool during filtering thereof and are returned to the deep fryers cold or at a much reduced temperature. As a result of the foregoing, the oils must be reheated in the deep fryers before deep frying can be resumed. Such reheating of the oils in deep fryers is an undesirable, costly time and power-consuming operation.

To the best of my knowledge and belief, the prior art in recent years has directed much attention to the development and provision of unique and highly sophisticated oil filtering means which operate or are intended to operate to remove, neutralize or otherwise counteract the adverse effects of those fatty acids and the like which are leached or rendered from foods being cooked and which will ultimately result in degrading cooking oil to an extent that it can no longer be used. While the removal, neutralizing or otherwise counteracting the adverse effect of fatty acids and the like in cooking oil will extend the useful life of such oils and might be a desirable practice in some instances, it appears clear that it is seldom a practical and cost-effective practice. In most instances, when the oil in deep fryers has been used so long and has been so contaminated with fatty acids and the like that it is no longer fit for use, it is most cost-effective and practical to dispose of it and replace it with a fresh supply of oil.

In accordance with the above, for the most practical and cost-effective use of oils in deep fryers, it is only necessary that those solids which if left to remain in the oils, will burn and adversely affect the color, taste and odor of the oils, be removed therefrom before their adverse effects are attained.

OBJECTS AND FEATURES OF THE INVENTION

It is an object of my invention to provide an improved oil filter machine to filter the oils in deep fryers.

Another object of my invention is to provide an oil filter machine of the general character referred to which operates to continuously recycle oil in and between the machine and a related deep fryer whereby the oil in the deep fryer can be filtered while the deep fryer is in operation and use.

Yet another object and feature of my invention is to provide an oil filter machine of the general character referred to above which is such that it delivers and directs a stream of oil in to the lower portion of a related deep fryer cooking vessel to cause oil at the bottom of the tank to turbulate and move solids which have settled in the bottom of the tank into suspension in the oil; which is such that it draws solids ladened oil from the upper portion of the deep fryer tank and conducts it through a filter means; and which is such that it delivers filtered oil back into the deep fryer tank, whereby solids in and carried by the oil are progressivly filtered during recirculation of the oil in and between the deep fryer and the filter machine.

It is another object and feature of my invention to provide an oil filter machine of the character referred to which includes a motor driven pump and related piping and valving means whereby oil can be made to recirculate in the machine and the volume and the rate of flow of oil flowing to and from the oil filtering means and to and from the deep fryer can be adjusted and balanced as desired and as circumstances require to most effectively and efficiently remove solids from the oil.

An object and feature of my invention is to provide an oil filtering machine of the general character referred to above which is simple, easy and economical to make and operate and which is so small, neat and compact that it can be easily and conveniently used to filter the oil in deep fryers in those small kitchen areas and the like in which deep fryers are commonly used and during ongoing use of the deep fryers.

The foregoing and other objects and features of my invention will be apparent and will be fully understood from the following detailed description of one preferred form and embodiment of my invention, throughout which description reference is made to the accompanying drawings:

DESCRIPTION OF THE DRAWINGS

FIG. 3 is an isometric view of a portion of the machine;

FIG. 4 is a view of a portion of the structure shown in FIG. 3;

FIG. 5 is an isometric view of another portion of the invention;

FIG. 6 is a view of a filter screen unit;

FIG. 7 is a view of a nozzle;

FIG. 8 is a diagrammatic view of a portion of another embodiment of my invention;

FIG. 9 is a diagrammatic view of yet another embodiment of my invention.

DETAILED DESCRIPTION OF THE INVENTION

Figure 2:
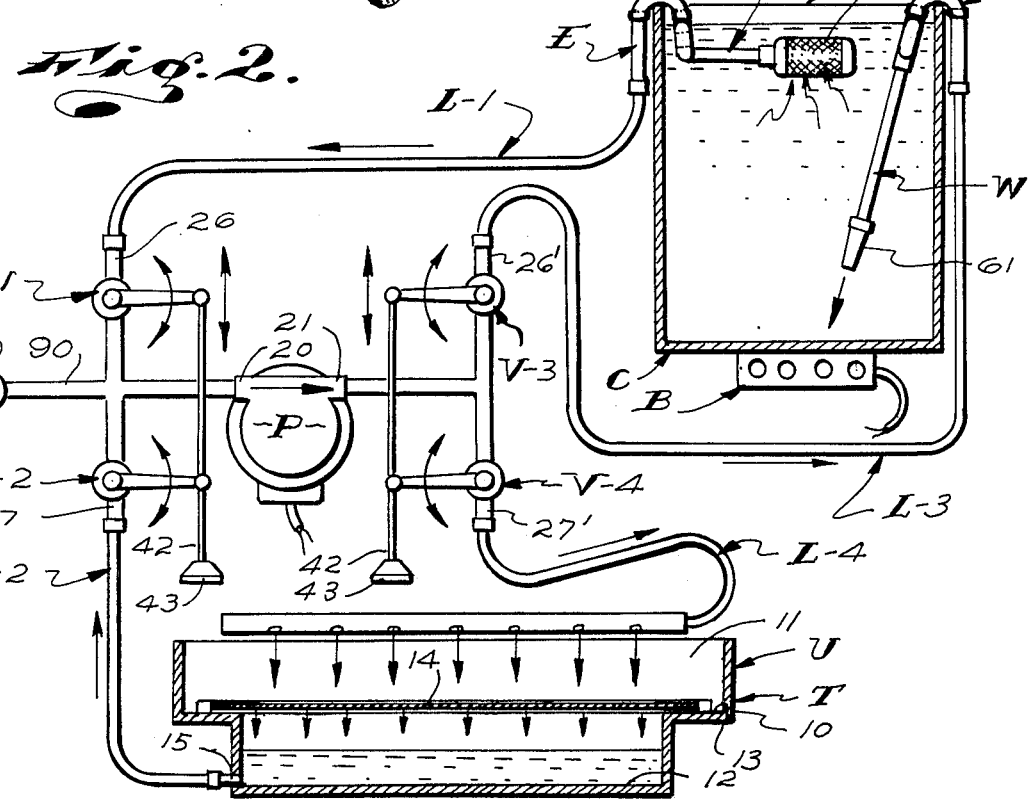
FIG. 2 is a diagrammatic view of my invention.

The oil filtering machine M that I provide is intended and designed to filter the hot liquid fat or oil in a deep fryer unit F. In FIG. 2 of the drawings, I have diagrammatically illustrated a deep fryer unit F in combination with my machine M. The unit F includes a vertically extending upwardly opening cooking vessel C with vertical side walls and a horizontal bottom wall and a burner or heater unit B below the vessel, adjacent the bottom wall thereof and serving to heat and maintain a supply of oil in the vessel at some predetermined desired cooking temperature, for example, 350°. Substantially any large commercial or industrial type deep fryer unit with an open and accessible cooking vessel such as is diagrammatically shown in FIG. 2 of the drawings can be used in combination with or serviced by my machine.

Figure 1:
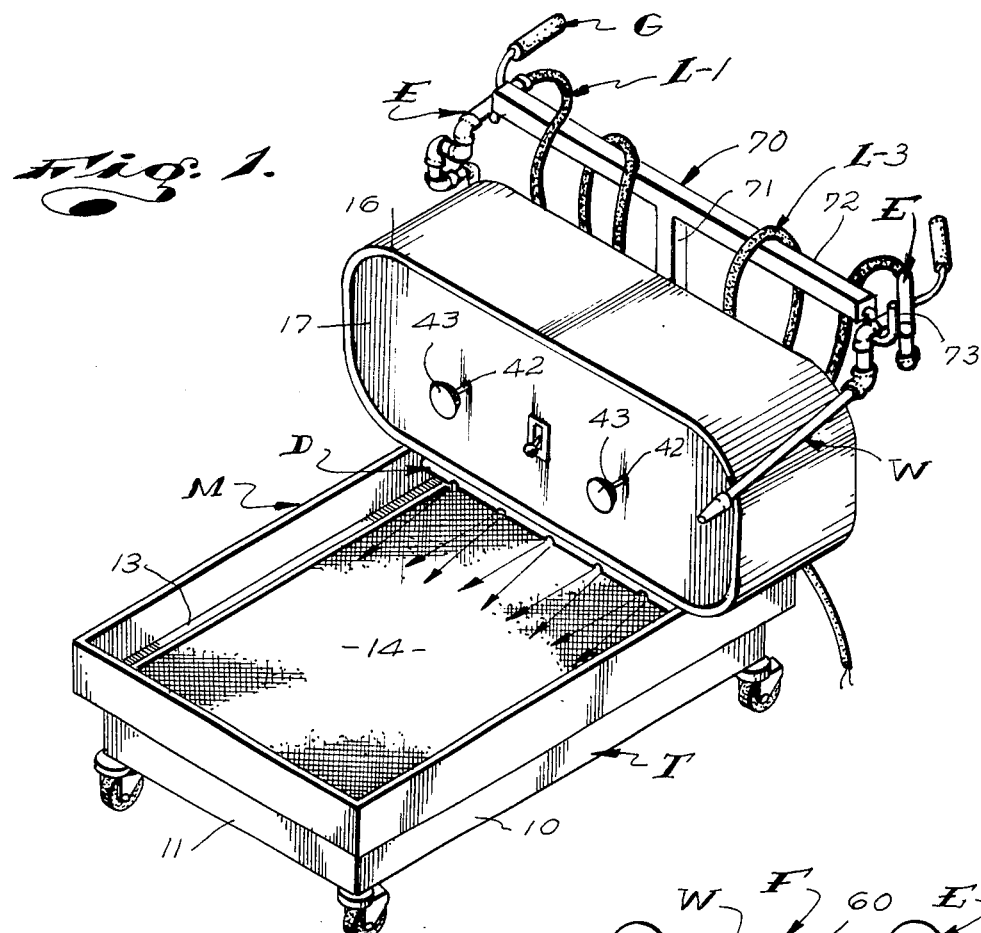
FIG. 1 is an isometric view of an oil filtering machine embodying my invention.

Referring to FIGS. 1 and 2 of the drawings, the machine that I provide includes a filtering unit U to filter hot fluid cooking oil or fat, a liquid or oil flow control system S including a motor driven pump P, a system of liquid conducting lines and hoses and valves which operate to move and control the flow of oil from and to the vessel C of a related deep frying unit F and to and from the filtering unit U of the machine.

The filtering unit U can vary greatly in construction and is shown as including a flat horizontal upwardly opening tank T with substantially vertical side and end walls 10 and 11 and a horizontal bottom wall 12. The tank T is shown as being rectangular in plan configuration. The upper and lower portions of the side and end walls are offset to establish a flat upwardly disposed support shoulder 13 about the inner perimeter of the tank on a central plane between the planes of the open top of the tank of the bottom wall thereof. A flat substantially horizontal oil filtering panel 14 is positioned in the tank T on said central plane and is supported by the shoulder 13. The portion of the tank below the panel 14 is a catch basin for filtered oil and has a drain fitting 15 accessible at the exterior of the tank.

The system S is shown positioned at and above one end of the tank and is enclosed within and protected by a suitable housing 16, as shown in FIG. 1 of the drawings. In practice, the housing 16 occurs about a suitable frame work (not shown) which is removably engaged on and rests atop the rim of the tank T and on or to which the various components and parts of the system S are mounted or secured, as desired or as circumstances require. Since the above noted frame can vary widely in details of construction and since the manner in which the housing 16 and other parts of the machine are related to it, and in no way alters or affects the novelty of my invention, I will not burden this disclosure with further unnecessary detailed illustration and description of said frame.

The pump P of the system S is a motor driven pump and has liquid inlet and outlet ports 20 and 21 which are formed to connect with liquid conducting lines or fittings, in accordance with common practice.

The system S, in addition to the pump P, includes an oil inlet system I connected with the inlet or inlet port 20 of the pump P and an oil outlet system O connected with the outlet or outlet port 21 of the pump P. The systems I and O are subsystems of the above referred to system S.

The inlet system I operates to conduct and control the flow rate and volume of unfilter hot oil drawn from the vessel C of the deep fryer F by the pump P and to conduct and control the flow rate and volume of filtered cooled oil from the filter unit U to the pump P. More particularly, the inlet system I is such that it can be adjusted and set so that the oil drawn to and moved by the pump P can be entirely unfiltered hot oil drawn from the deep fryer F; entirely cooled filtered oil drawn from the filter unit U; or can be any desired proportional combination or mixture of hot unfiltered oil and cooled filtered oil.

The outlet system O operates to conduct oil drawn by the pump P from the fryer and filter units F and U and discharged by the pump P to the fryer F, to the filter unit U, or in any desired proportions to both the fryer and filter units.

The inlet system I inludes first and second inlet valves V-1 and V-2 with downstream outlet ports or sides and upstream inlet ports or sides to connect with suitable fluid conducting fittings or lines. The downstream or outlet sides of the valves V-1 and V-2 are connected with the inlet 20 of the pump P. Referring to FIG. 3 of the drawings, the valves V-1 and V-2 can and are shown connected with the inlet 20 of the pump P by means of a T-fitting 22 and by means of three nipples 23, 24 and 25 connected with the fitting 22 and with related sides of the noted valves and with the pump P. The valve V-1 is connected with the cooking vessel C of the fryer unit F by an elongate fluid conducting first suction line L-1. The downstream end of the line L-1 is shown connected with the inlet side of the valve V-1 by means of a nipple 26. The line L-1 is preferably a length of flexible, heat resistant, liquid conducting suction hose and is such that its upstream or free end can be easily and conveniently manually moved about and relative to the machine M and the related deep fryer F to position that end of the line at or in the cooking vessel C of the deep fryer.

In practice, the lines L-1 can be made up of metal tubing, a combination of metal tubing sections and flexible hose sections, or fluid conducting swivel joints, without departing from the broader spirit and aspects of my invention.

The valve V-2 is connected with the filter unit U by and elongate fluid conducting second suction line L-2 with a downstream end connected with the inlet side of the valve, as by means of a nipple 27. The line L-2 can be established or fabricated of substantially rigid metal tube but is preferably a length of flexible heat resistant liquid conducting suction hose. The line L-2 extends to and its upstream end is releasably connected with the drain fitting 15 on the tank T of the filter unit U.

With the inlet system I thus far described, it will be apparent that the pump P is operable to draw oil from both the deep fryer unit F and the filter unit U and that by adjusting the valves V-1 and V-2, the pump can be made to draw oil from one or the other of the units U and F or to draw oil from both of the units U and F in any desired proportion.

The outlet system O includes first and second outlet valves V-3 and V-4 with downstream outlet sides and upstream inlet sides made to connect with suitable fluid conducting lines and fittings. The upstream sides of the valves V-3 and V-4 are connected with the outlet side 21 of the pump P. Referring to FIG. 3 of the drawings, the valves V-3 and V-4 can, as shown, be connected with the outlet side 21 of the pump P by means of a T-fitting 22' and by means of three nipples 23', 24' and 25' connected with the fitting 22' and with related sides of the noted valves and of the pump.

The valve V-3 is connected with the cooking container C of the fryer unit F by an elongate fluid conducting first delivery line L-3. The line L-3 has an upstream end connected with the outlet side of the valve V-3 by means of a nipple 26'. The line L-3 is preferably a length of flexible heat resistant liquid conducting hose and is such that its downstream or free outlet end can be easily and conveniently moved about relative to the machine M and the related deep fryer unit F to position the downstream end thereof at or in the cooking vessel C of the deep fryer F.

In practice, the line L-3 can be made up of metal tubing, a combination of metal tube sections and flexible hose sections or fluid conducting swivel joints, without departing from the broader aspects and spirit of my invention.

The valve V-4 is connected with the filter unit U by an elongate fluid conducting second delivery line L-4 with an upstream end connected with the outlet side of that valve, as by means of a nipple 27'. The line L-4 can be established or fabricated of metal tube stock but is preferably a length of flexible heat resistant liquid conducting hose. The line L-4 extends to and its downstream or outlet end is positioned at one end of the tank T of the unit U above the filter panel 14 therein.

With the outlet system O thus far described, it will be apparent that the oil delivered by the pump P can, by operation of the valves V-3 and V-4, be directed and made to flow to the tank T of the filter unit U, to the vessel C of the fryer unit F, or can be directed and made to flow to both the tank T and the vessel C in any desired proportion.

In furtherance of my invention and as shown in FIGS. 1 and 2 of the drawings, the outlet system O includes an oil distributor D at the outlet end or downstream end of the line L-4. The distributor D occurs above and extends transverse the filter panel 14 in the tank T at said one end thereof. The distributor D is shown as a length of tubing with a plurality of longitudinally spaced longitudinally forwardly and downwardly disposed fluid outlet ports and is arranged and disposed to direct and distribute oil laterally across and longitudinally of the top surface of the filter panel 14 at one end portion thereof. It will be apparent that the distributor D is one of many different and effective means that might be used to effect desired spreading and distribution of oil on and across the top surface of the filter panel 14.

In furtherance of my invention and as shown in FIG. 3 of the drawings, the pair of valves V-1 and V-2 of the inlet system I are operatively connected together and the pair of valves V-3 and V-4 of the outlet system O are operatively connected together so that the valves of each pair of valves are operated and adjusted simultaneously by manual operation of a common manually engageable operating part.

In the form of the invention illustrated, the valves of each pair of valves are plug valves with rotatable operating stems 40. The stems are provided with and carry radially projecting lever arms 41. An elongate operating rod 42 extends between and is pivotally connected with the outer free end portions of the arms 41 of each pair of valves. The operating rod for each pair of valves has an extension at one end which projects to a station where it can be conveniently manually engaged and which is shown provided with an enlarged manually engageable operating knob 43. In the case illustrated, the extensions of the operating rods 41 extend through openings in the front wall 17 of the housing 16 and the knobs 43 are clearly visible and accessible at the exterior of the housing for convenient manual engagement.

It will be apparent that upon manual engagement and axial shifting of the rod 41 related to one or the other of the two pairs of valves, the valves of each pair of valves are simultaneously adjusted as desired or as circumstances require.

In practice, and as shown in FIGS. 3 and 4 of the drawings, the lever arm 41 of one valve of each pair of valves is pivotally connected with its related rod 42 by a block 45 pivotally connected with the lever arm 41 and slidably engaged on the rod 42. The block carries a set screw 46 which engages the rod. With the noted block and set screw, it will be apparent that the position or set of the valve with which the valve and set screw are related can be adjusted and set in any desired relationship relative to the adjustment or set of the other related valve by simply loosening the set screw, shifting the block longitudinally of the rod, as circumstances require, and resetting the set screw.

In furtherance of my invention and as shown in FIGS. 1, 2 and 5 of the drawings, the free ends of the suction line L-1 and delivery line L-3, which extend to the cooking vessel C of the fryer F, are provided and equipped with manually engageable, adjustable fluid conducting handle units E. The units E include manually engageable handgrips G, articulated fluid conducting hook means M and elongate fluid conducting stems or wands W. The handgrips G of the handle units E are made of wood or other material having a low index of heat conductivity and are connected with and carried by metal tube parts 50 engaged on the downstream ends of the lines L-1 and L-3 in lateral spaced relationship therewith.

The articulated hook means M of the units E are established of the following series of threaded together pipe fittings; an elbow 51 connected with the downstream end of the tube part 50, an elbow 52 connected with the elbow 51, a nipple 53 connected with the elbow 52, an elbow 54 connected with the nipple 53, an elbow 55 connected with the elbow 54, a sleeve 56 connected with the elbow 55, and an elbow 57 connected with the sleeve 56 and with which the stem or wand W is connected. The several fittings 51 through 57 are snugly but not tightly screw-threaded together for limited relative turning relative to each other and establish an articulated hook-like assembly.

The above noted articulated hook assemblies of the handle units E are such that the several fittings making up those hook assemblies can be frictionally turned relative to each other, as indicated by the arrows in FIGS. 5 of the drawings and so that the units E can be hookedly engaged on and over the rims of related deep fryer cooking vessels with the wands thereof extending into the cooking vessels at any desired angle and terminating in the vessels at any desired position therein.

In furtherance of my invention and as shown in FIGS. 2 and 6 of the drawings, the free end of the wand W carried by the handle E on the line L-1 of the inlet system I is connected with and carries a screen type strainer 60 which prevents large particles of food stuff in the oil in the cooking vessel C from being drawn into the machine.

Further, and as shown in FIGS. 1, 2 and 7 of the drawings, the wand W of the handle unit E on the delivery line L-3 of the system O is provided with and carries a nozzle 61 which operates to direct oil flowing through that wand into the vessel C in the form of a high velocity work performing jet.

In normal anticipated use of my invention, the jet of oil delivered by the nozzle 61 of the outlet system O into the vessel C of the deep fryer unit F is directed toward the bottom of the vessel C to move solids which have settled in the vessel and to put them into suspension in the oil in the vessel. The screen 60 on the wand related to the line L-1 of the inlet system I is normally and preferably positioned within the oil in the vessel C near the top surface thereof where a great portion of those free solids which are to be filtered from the oil normally occur.

In operation, my machine is related to the deep fryer unit F substantially as shown in FIG. 2 of the drawings when the oil in the cooking vessel C is hot and food is being cooked. The pump P is put into operation and hot oil is drawn from the vessel and delivered to the filter unit U where it is filtered. During transportation and filtering of the oil, the oil cools. The cooled and filtered oil is drawn from the unit U and delivered back into the cooking vessel C. The cooled filtered oil cools the hot oil in the vessel at a rate which is faster than the rate at which the burner or heating unit of the fryer unit can heat the oil in the vessel. Accordingly, if the above noted operation of my invention was let to continue without adjustment or change, the oil in the cooking vessel would be cooled below cooking temperature and the deep fryer unit would have to be put out of service. In accordance with the above, the temperature of the oil in the vessel A is monitored when my machine is first put into operation and the flow rate and volume of hot oil drawn from and the flow rate and volume of filtered oil returned to the cooking vessel are reduced to that flow rate and volume where the heating unit or means of the deep fryer unit F is capable of and works to keep oil in the cooking vessel at desired cooking temperature.

Further, in the course of operating and adjusting the machine in the manner set forth above and for the purpose noted, the rate and flow of yet to be filtered oil into the filtering unit U must be limited and controlled so as not to exceed the rate at which the oil delivered to the unit U is filtered and so that overflowing of the unit U is not encountered. Further, as the filtering operation continues and filtrates collect on the top of the filter panel 14, the rate at which oil can be delivered to the unit U decreases and the flow rate of oil to that unit must be adjusted.

In accordance with the above, in operation of my machine, the pump P continuously operates to recirculate oil from and back into the cooking vessel C of the fryer unit F and during recirculation of the oil, bypasses a predetermined volume of that oil through the filter unit U whereby the temperature of the oil in the cooking vessel remains at cooking temperature and/or the rate of flow and volume of oil delivered to the filter unit U is limited to a rate of flow and volume which does not exceed the rate of flow of the filter unit U and filters the oil.

Full or complete filtering of the supply of oil in the cooking vessel C by means of my filtering machine M is notably slower and takes more time than filtering equivalent volumes of cooking oil in and by means of most of those distinct forms of filtering machines provided by the prior art. However, filtering of the oil in the deep fryer with my machine can be carried out while the deep fryer is in operation and during those business hours when the deep fryer is manned by one or more cooks. With my machine, the deep fryer unit F need not be taken out of operation in order to filter the oil therein and filtering of the oil need not be delayed until those late and "after closing" hours when the fryer unit is not normally in use.

While filtering the oil in a deep fryer with my machine is slow, it is not so slow as to be troublesome or inconvenient. I have determined that in point of fact, in most instances where my machine might be used, the fact that the deep fryers being serviced by machine need not be put out of service and the fact that filtering of the oil in the fryer or fryers need not be delayed until after normal working hours when extra personnel might have to be hired or overtime wages paid, makes my machine more economical and desirable to use than machines for like purposes provided by the prior art.

In the form of my invention shown in the drawings, the tank T of the filter unit U is provided with an upwardly projecting rack 70 to facilitate moving the machine about and releasably support the elongate flexible hoses or lines L-1 and L-3, substantially as shown in FIG. 1 of the drawings.

The rack 70, as shown, can be a simple T-shaped structure fabricated of metal tube stock and is characterized by a central vertical leg 71, the lower end of which is suitably fixed to laterally extending header 72 which can be conveniently manually engaged and over which the lines L-1 and L-3 can be engaged. The ends of the header 72 can be and are shown provided with hooks 73 to engage and support the handle units E.

As shown in the first form of my invention, the valve means of the system I and O include the pairs of valves V-1/V-2/V-3 and V-4 which operate to divide the flow of oil from the cooking vessel C and filter unit U to the pump P and from the pump P to said vessel and filter unit. In practice, and as shown in FIG. 8 of the drawings, the pairs of valves for the system I' and O' can be replaced by single flow dividing valves 80 and 81. It will be apparent that the valves 80 and 81 perform the same basic function as the pairs of valves in my first embodiment of the invention and are full mechanical equivalents thereof. The pairs of valves in my first form of the invention are preferred because those valves are more readily available and are considerably less expensive than flow dividing valves. Further, the pairs of valves used in my first form of the invention allow for some adjustment which is not attainable in flow dividing valves such as are shown in FIG. 8.

In FIG. 9 of the drawings, I have shown yet another embodiment of my invention wherein the outlet system $O^2$ is provided with but one valve 82 to control the flow of oil from the pump P to the line L-3. The flow of oil from the pump P to the line L-4 is uncontrolled. With such a valve and piping system, while flow from the pump P to the lines L-3 and L-4 is not divided in a positive controlled manner, by opening and closing the valve 82 flow from the pump to the line L-3 is bled off and caused to flow through the line L-4, thereby dividing the flow of oil from the pump to the lines L-3 and L-4. In a reduction to practice of this last embodiment of my invention, it was determined that while the single valve 82 did not afford as positive and accurate control of the flow of oil as the other valve means that I provide, that control which was attained is adequate for practical use of my invention in most instances.

In accordance with the foregoing, it will be apparent that the valve means in the systems I and O of my invention is subject to rather wide variations without materially altering the operation and/or departing from the broader aspects and spirit of my invention.

In practice, and as shown at the left-hand side of FIGS. 2 and 3 of the drawings, the system S can be provided with a drain line 90 and a shut-off valve 91 to allow for connecting the system with a supply of hot water and detergent or solvent for the purpose of cleaning the system S and/or to allow for connecting the system with a waste line into which the system can be let to drain.

While such a valve controlled drain is not really needed, I have determined that certain sanitary codes throughout the country arbitarily require means to drain and facilitate cleaning this general class of machine or equipment and the line 90 and valve 91 are understood to satisfy such code requirements.

Having described only typical preferred forms and embodiments of my invention, I do not wish to be limited to the specific details herein set forth but wish to reserve to myself any modifications and/or variations that might appear to those skilled in the art and which fall within the scope of the following claims:

Having described by invention, I claim:

1. An oil filtering machine for use in combination with a deep fryer unit having an upwardly opening cooking vessel containing a supply of hot cooking oil, said machine includes a filter unit comprising a vertically extending tank and a filter panel in the tank spaced above the bottom thereof, a liquid circulating system including a motor driven pump with an inlet and an outlet, an oil inlet system including an elongate oil conducting first suction line with an upstream end extending to and communicating with the cooking vessel, an elongate oil conducting second suction line with an upstream end communicating with the tank below the filter panel, adjustable first valve means connected with and between the inlet of the pump and the downstream ends of said first and second suction lines and operating to proportionally vary the flow rate and volume of oil moving from the vessel and tank through the suction lines to the pump, an oil outlet system including an elongate oil conducting first delivery line with a downstream end extending to and communicating with the cooking vessel and an elongate oil conducting second delivery line with a downstream end communicating with the tank above the filter panel, an adjustable second valve means connected with and between the outlet of the pump and the upstream ends of said first and second delivery lines and operating to proportionally vary the flow rate and volume of oil moving from the pump through the delivery lines and to said vessel and tank.

2. The oil filtering machine set forth in claim 1 wherein the first adjustable valve means includes first and second adjustable valves with upstream and downstream sides, liquid conducting fittings connecting the downstream sides of the adjustable valves with the inlet of the pump and liquid conducting fittings connecting the upstream sides of the adjustable valves with the downstream ends of the first and second suction lines, the second adjustable valve means includes first and second flow control valves with upstream and downstream sides, liquid conducting fittings connecting the upstream sides of the flow control valves with the outlet of the pump and fluid fittings connecting the downstream sides of the first and second flow control valves with the upstream sides of the first and second delivery lines.

3. The oil filtering machine set forth in claim 1 wherein the first adjustable valve means includes an adjustable flow dividing first valve with first and second inlet sides and an outlet side, liquid conducting fittings connecting the first and second inlet sides with the first and second suction lines and a liquid fitting connecting the outlet side with the inlet of the pump, said second adjustable valve means includes an adjustable flow dividing second valve with first and second outlet sides and an inlet side, liquid conducting fittings connecting the first and second outlet sides with the first and second delivery lines and a liquid fitting connecting the inlet side with the outlet side of the pump.

4. The oil filtering machine set forth in claim 1 wherein at least one of the first and second adjustable valve means includes a manually operable valve with an inlet connected with the outlet of the pump and an outlet connected with the upstream end of one of said delivery lines and wherein the upstream end of the other of said delivery lines is connected with the other.

5. The oil filtering machine set forth in claim 1 which further includes oil conducting handle units at the upstream end of said first suction line and at the downstream end of said first delivery line, said handle units are elongate structures with inner ends connected with their related lines and include manually engageable hand grips at their inner end portions, straight elongate oil conducting wands at their outer end portions, intermediate hook portions between the grips and wands and engageable with the rim of the cooking vessel, the wand of one handle unit has an oil filter screen at its outer end and the wand of the other handle unit has an oil jet directing nozzle at its outer end.

6. The oil filtering machine set forth in claim 1 wherein the filter panel is a substantially flat horizontal unit with opposite ends and right angularly related longitudinal and lateral axes, said machine further includes an oil distributor at the downstream end of the second delivery line extending transverse to the longitudinal axis of the filter panel at one end portion thereof and delivering oil onto the panel across the lateral axis thereof and directing that oil longitudinally toward the other end thereof.

7. The oil filtering machine set forth in claim 1 wherein the first adjustable valve means includes first and second adjustable valves with upstream and downstream sides, liquid conducting fittings connecting the downstream sides of the adjustable valves with the inlet of the pump and liquid conducting fittings connecting the upstream sides of the adjustable valves with the downstream ends of the first and second suction lines, the second adjustable valve means includes first and second flow control valves with upstream and downstream sides, liquid conducting fittings connecting the upstream sides of the flow control valves with the outlet of the pump and fluid fittings connecting the downstream side of the first and second flow control valves with the upstream side of the first and second delivery lines, said filter panel is a substantially flat horizontal unit with opposite ends and right angularly related longitudinal and lateral axes, an oil distributor at the downstream end of the second delivery line extending transverse to the longitudinal axis of the filter panel at one end portion thereof and delivering oil onto the panel across the lateral axis thereof and directing that oil longitudinally toward the other end thereof.

8. The oil filtering machine set forth in claim 1 wherein the first adjustable valve means includes an adjustable flow dividing first valve with first and second inlet sides and an outlet side, liquid conducting fittings connecting the first and second inlet sides with the first and second suction lines and a liquid fitting connecting the outlet side with the inlet of the pump, said second adjustable valve means includes an adjustable flow dividing second valve with first and second outlet sides and an inlet side, liquid conducting fittings connecting the first and second outlet sides with the first and second delivery lines and a liquid fitting connecting the inlet side with the outlet side of the pump, an oil distributor at the downstream end of the second delivery line extending transverse to the longitudinal axis of the filter panel at one end portion thereof and delivering oil onto the panel across the lateral axis thereof and directing that oil longitudinally toward the other end thereof.

9. The oil filtering machine set forth in claim 1 wherein at least one of the first and second adjustable valve means includes a manually operable valve with an inlet connected with the outlet of the pump and an outlet connected with the upstream end of one of said delivery lines and wherein the upstream end of the other of said delivery lines is connected with the other, an oil distributor at the downstream end of the second delivery line extending transverse to the longitudinal axis of the filter panel at one end portion thereof and delivering oil onto the panel across the lateral axis thereof and directing that oil longitudinally toward the other end thereof.

10. The oil machine set forth in claim 1 which further includes oil conducting handle units at the upstream end of said first suction line and at the downstream end of said first delivery line, said handle units are elongate structure with inner ends connected with their related lines and include manually engageable hand grips at their inner end portions, straight elongate oil conductig wands at their outer end portions, intermediate hook portions between the grips and wands and engageable with the rim of the cooking vessel, the wand of one handle unit has an oil filter screen at its outer end and the wand of the other handle unit has an oil jet directing nozzle at its outer end, said filter panel is a substantially flat horizontal unit with opposite ends and right angularly related longitudinal and lateral axes, an oil distributor at the downstream end of the second delivery line extending transverse to the longitudinal axis of the filter panel at one end portion thereof and delivering oil onto the panel across the lateral axis thereof and directing that oil longitudinally toward the other end thereof.

* * * * *